Patented July 29, 1947

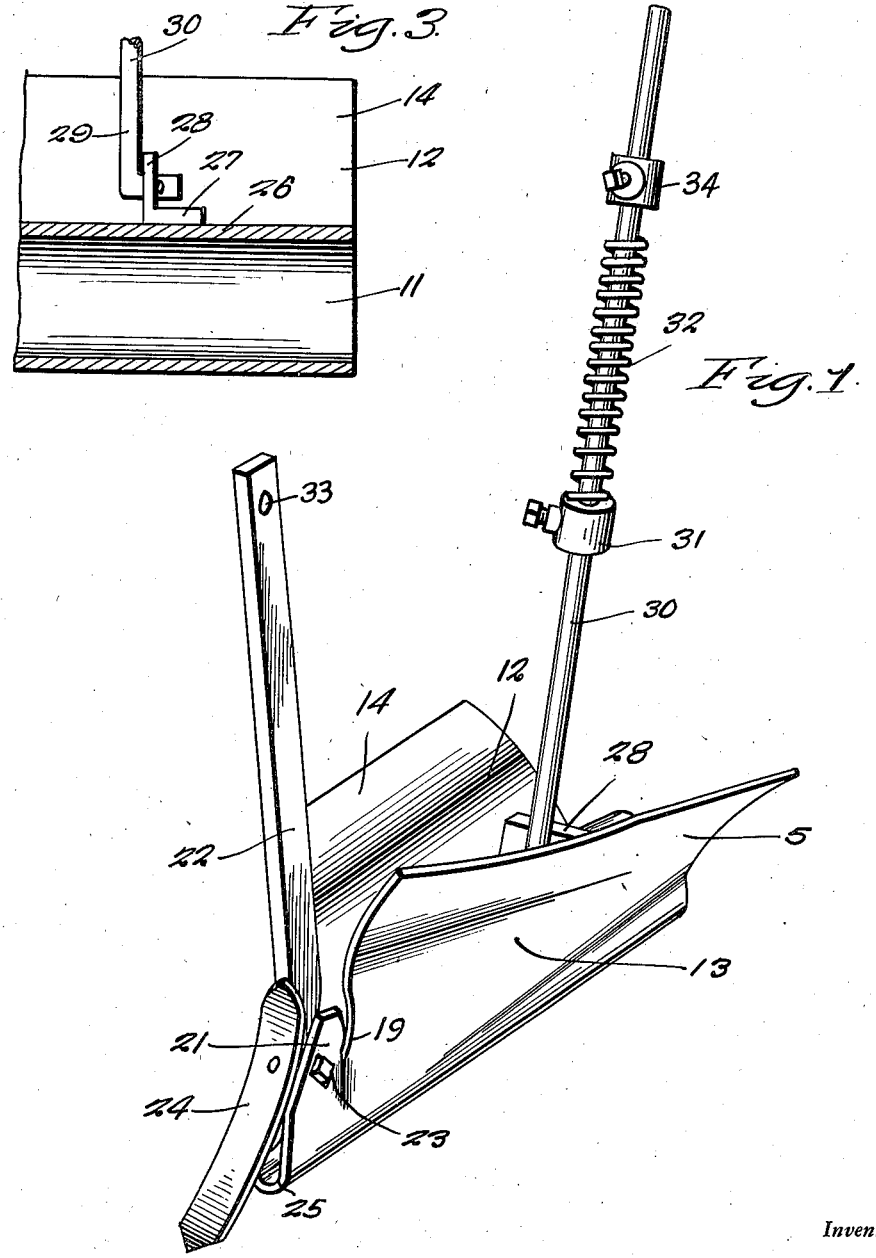

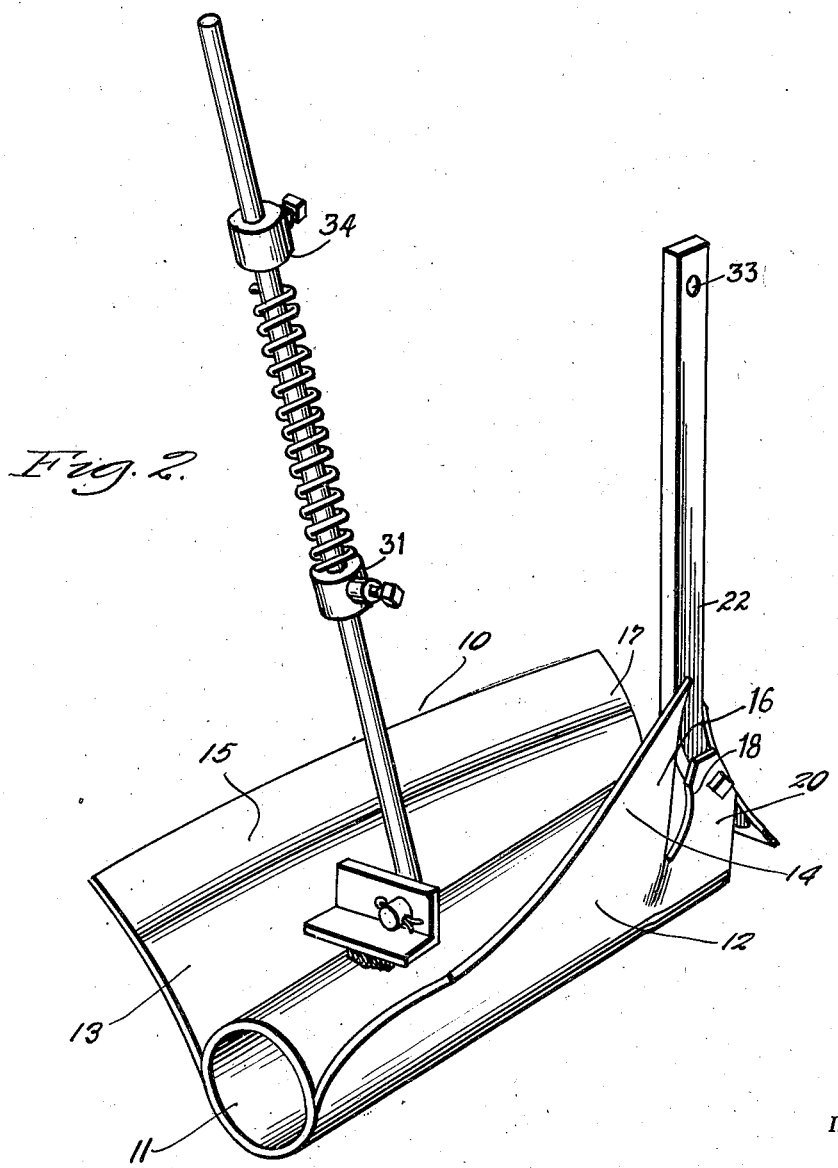

2,424,820

UNITED STATES PATENT OFFICE 2,424,820

IRRIGATION DITCH PLOW

Hugh M. Hall, White Swan, Wash.

Application December 27, 1944, Serial No. 569,958

4 Claims. (Cl. 37—98)

This invention relates to plows and has for its object to provide a plow by means of which irrigation ditches may be quickly and inexpensively dug.

Another object of the invention is to provide a ditch digging plow for shallow ditches including means for smoothing the bottom of the ditch and pressing down the banks of the ditch.

Other features and advantages will become more readily apparent from the following description and the accompanying illustrative drawings in which:

Figure 1 is a perspective view of my ditching plow,

Figure 2 is a similar view, looking from the rear thereof, and

Figure 3 is a detail sectional view.

In the following specification and in the several views in the drawings like reference characters indicate like parts and in which 10 indicates my plow as an entirety, the details of which are as follows:

From a longitudinal tubular bottom 11, extend on each side thereof wings 12 and 13, which are curved over along their upper portion 14 and 15. In the forward parts 16 and 17, are cut-outs 18 and 19, providing vertical tongues 20 and 21, between which is clamped an upright beam 22, by means of a bolt 23. To the lower end of the beam is attached a cultivator tooth plow 24, which extends somewhat below the forward end 25, of what may be termed the plow share.

Mounted adjacent to the rear end 26, of member 11, is an angle-iron 27, to the flange 28, of which is attached the lower end 29, of an upright rod 30, on which is an adjustable collar 31, forming a seat for a spring 32, coiled around the rod 30. The member 22, is provided with a bore 33, whereby it may be connected to a cultivator by a common beet cultivator or other clamp (not shown). The spring 32, is also adapted to be pressed down by means of a lever attached to a cultivator but not shown in the drawings.

In operation the device is hitched to a beet cultivator or any other drawn implement and the tooth 24, loosens the soil ahead of the ditcher which plows through said soil, spreading and packing the dirt on each side thereof by means of its bottom and wings, thus providing a shallow ditch between beet or other vegetable rows. Tension brought to bear upon the spring 32, will cause the rear of the plow to smooth the bottom of the ditch being formed. A collar 34, is adapted to hold the referred to lever in place upon the spring 32, and also prevent the spring from becoming detached from the rod 30, when the lever is not connected thereto.

It is noted that a hollow tube member is used at the base of this device for the purpose of permitting a substantially free flow of liquid therethrough during the operation of the invention.

It is well known that irrigation ditches must be periodically serviced to keep them open and this invention has been designed to perform this function without impeding free flow of said liquid.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new is:

1. In a device of the nature described comprising a tube open throughout, wings of the length of the tube with cut-outs in the forward ends providing vertical bearing members, a beam clamped between said members, a plow shovel attached to the beam, said wings being integral with the tube and being gradually curved from one end thereof to opposite end of the tube to flatten down the banks of a ditch, and an upright spring controlled bar mounted upon the rear of the tube for adjusting pressure thereon.

2. In a device of the nature described comprising a tube open throughout, wings of the length of the tube with cut-outs in the forward ends providing vertical bearing members, a beam clamped between said members, a plow shovel attached to the beam, said wings being integral with the tube and being gradually curved from one end thereof to other end of the tube to flatten down the banks of a ditch.

3. In a device of the nature described comprising a tube open throughout, wings of the length of the tube with cut-outs in the forward ends providing vertical bearing members, a beam clamped between said members, a plow shovel attached to the beam, and said wings being integral with the tube.

4. In a device of the nature described comprising a tube open throughout, wings of the length of the tube with cut-outs in the forward ends providing vertical bearing members, a beam clamped between said members, and a plow shovel attached to the beam.

HUGH M. HALL.

REFERENCES CITED

The following references are of record in the file of this patent:

UNITED STATES PATENTS

| Number | Name | Date |
|---|---|---|
| 10,886 | Farr | May 9, 1854 |
| 478,034 | Thompson | June 28, 1892 |
| 1,508,329 | Horton | Sept. 9, 1924 |
| 2,010,979 | Crawford | Aug. 13, 1935 |